United States Patent
Al-Asaaed et al.

(10) Patent No.: US 10,868,696 B2
(45) Date of Patent: Dec. 15, 2020

(54) MANAGING VPN CONNECTIVITY FOR DATA COMMUNICATIONS

(71) Applicant: BlackBerry Limited, Waterloo (CA)

(72) Inventors: Ennis Al-Asaaed, Ottawa (CA); Barry Fraser Yerxa, Ottawa (CA)

(73) Assignee: BlackBerry Limited, Waterloo (CA)

( * ) Notice: Subject to any disclaimer, the term of this patent is extended or adjusted under 35 U.S.C. 154(b) by 947 days.

(21) Appl. No.: 14/742,520

(22) Filed: Jun. 17, 2015

(65) Prior Publication Data

US 2016/0373275 A1  Dec. 22, 2016

(51) Int. Cl.
| | |
|---|---|
| *H04L 12/46* | (2006.01) |
| *H04L 12/24* | (2006.01) |
| *H04L 12/713* | (2013.01) |
| *H04L 29/06* | (2006.01) |
| *H04L 29/08* | (2006.01) |
| *G06F 21/53* | (2013.01) |

(52) U.S. Cl.
CPC ...... *H04L 12/4641* (2013.01); *H04L 41/0893* (2013.01); *H04L 45/586* (2013.01); *H04L 63/0272* (2013.01); *G06F 21/53* (2013.01); *G06F 2221/2111* (2013.01); *H04L 67/327* (2013.01)

(58) Field of Classification Search
CPC ............ H04L 12/4641; H04L 41/0893; H04L 45/586; H04L 63/0272; H04L 63/164; H04L 67/327; G06F 21/53; G06F 2221/2111
See application file for complete search history.

(56) References Cited

U.S. PATENT DOCUMENTS

| | | |
|---|---|---|
| 8,549,617 B2 | 10/2013 | Wei et al. |
| 8,782,764 B2 | 7/2014 | Coskun et al. |
| 8,879,420 B2 | 11/2014 | Eichen et al. |

(Continued)

FOREIGN PATENT DOCUMENTS

| | | |
|---|---|---|
| EP | 2696553 | 2/2014 |
| WO | 2014/158229 | 10/2014 |

OTHER PUBLICATIONS

BlackBerry; "BlackBerry Blend"; retrieved from http://us.blackberry.com/software/desktop/blackberry-blend.html on May 1, 2015; 7 pages.

(Continued)

*Primary Examiner* — Kibrom T Hailu
(74) *Attorney, Agent, or Firm* — Fish & Richardson P.C.

(57) ABSTRACT

Methods, systems, and apparatus, including computer programs encoded on a computer storage medium, for managing virtual private network (VPN) connectivity for data communications are disclosed. In one aspect, a method includes storing, in a computer-readable medium of a computing device, packages of code and configuration data that associate the packages of code with respective virtual private networks (VPNs), the configuration data associating at least one of the packages of code with at least two of the VPNs, and, in response to a request to execute application code included in a first package of code, identifying, based on the configuration data, a first VPN associated with the first package of code and binding a communication interface of the first package of code to a connection with the first VPN.

4 Claims, 7 Drawing Sheets

(56) References Cited

U.S. PATENT DOCUMENTS

| | | | |
|---|---|---|---|
| 8,943,123 B2* | 1/2015 | Miyazaki | H04L 45/306 |
| | | | 709/203 |
| 9,438,564 B1* | 9/2016 | Weng | H04L 63/0281 |
| 2010/0315955 A1* | 12/2010 | Proulx | H04L 12/462 |
| | | | 370/244 |
| 2011/0107414 A1* | 5/2011 | Diab | G06F 21/6218 |
| | | | 726/15 |
| 2012/0005746 A1 | 1/2012 | Wei et al. | |
| 2013/0055347 A1* | 2/2013 | Chawla | H04W 12/08 |
| | | | 726/3 |
| 2013/0346606 A1 | 12/2013 | Ryerson et al. | |
| 2014/0047534 A1* | 2/2014 | Tse | H04L 63/0272 |
| | | | 726/13 |
| 2014/0047535 A1 | 2/2014 | Parla et al. | |
| 2014/0278623 A1* | 9/2014 | Martinez | G06Q 10/06 |
| | | | 705/7.12 |
| 2015/0036641 A1* | 2/2015 | Eichen | H04L 12/4633 |
| | | | 370/329 |
| 2015/0121538 A1 | 4/2015 | Hsu et al. | |
| 2016/0112871 A1* | 4/2016 | White | H04W 12/06 |
| | | | 726/4 |
| 2016/0219019 A1* | 7/2016 | Mathur | H04L 63/0272 |
| 2016/0286001 A1* | 9/2016 | Chan | H04L 12/6418 |

OTHER PUBLICATIONS

BlackBerry; "BlackBerry Enterprise Service 10; BlackBerry Device Service Solution"; Version 10.2; Sep. 10, 2014; 156 pages.

Samsung Electronics Co., Ltd., "Samsung Knox; White Paper: An Overview of Samsung KNOX"; Enterprise Mobility Solutions; Apr. 2013; 16 pages.

Wikipedia; "Virtual Private Network"; Retrieved on May 1, 2015; 6 pages.

Extended European Search Report issued in European Application No. 16172540.3 dated Nov. 15, 2016.

Communication Pursuant to Article 94(3) EPC issued in European Application No. 16172540.3 dated Aug. 24, 2017; 5 pages.

\* cited by examiner

MANAGING VPN CONNECTIVITY FOR DATA COMMUNICATIONS

TECHNICAL FIELD

This specification relates to managing virtual private network (VPN) connectivity for data communications, particularly for executing packages of code in computing devices.

BACKGROUND

Computing devices, e.g., mobile devices or desktop computers, have been used to communicate data in a network, e.g., the Internet. However, the network data can be restricted for access. For example, some websites such as News websites or online services such as Netflix video services are regionally content-controlled. Some nations censor what content is allowed or prohibited. Communication to the network data can be interrupted, which causes inconvenience to users such as business travelers or expatriates. In addition, some of the network data such as enterprise data can be sensitive. Users may not know whether secure communication such as HTTPS/Transport Layer Security (TLS) is used to transmit the sensitive data. In some cases, a user can use a virtual private network (VPN) to transmit data over the network. VPN extends a private network across a public network and enables a computing device to send and receive data across shared or public networks. However, managing VPN connectivity for multiple or dynamic data communications is still challenging.

BRIEF DESCRIPTION OF THE DRAWINGS

Like reference numbers and designations in the various drawings indicate like elements.

DETAILED DESCRIPTION

Figure 1A:
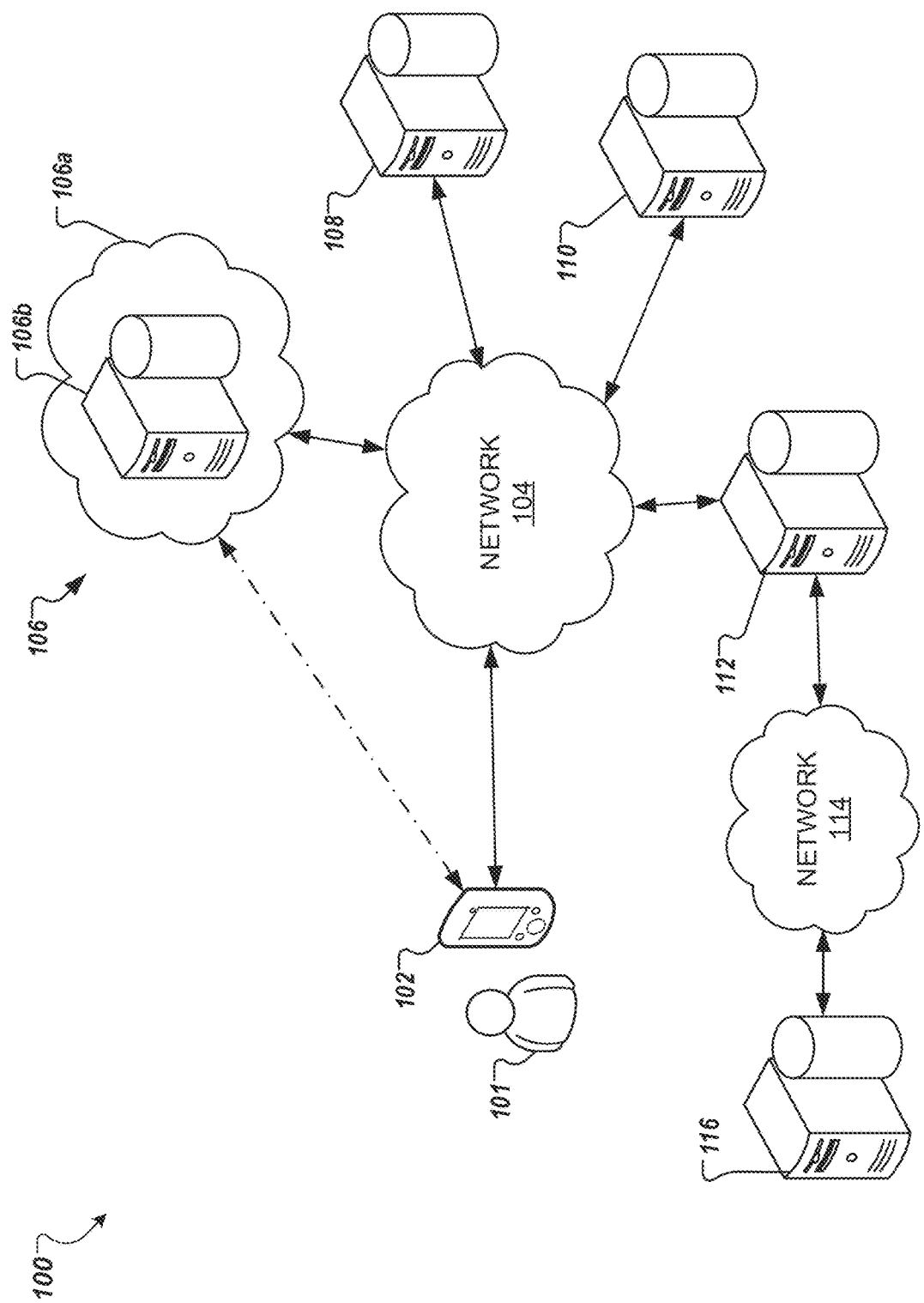
FIG. 1A is a schematic diagram showing an example data communication system.

This specification describes technologies relating to managing VPN connectivity for data communications. In some implementations, a user of the computing device can make a selection through a graphical user interface to associate multiple packages of code with respective VPNs in configuration data. One package of code can be associated with two or more VPNs in the configuration data. In response to a request to execute application code in a package of code, the computing device can establish a connection, e.g., a secured VPN tunnel, with one of the associated VPNs, e.g., based on a geographic location of the device, bind a communication interface with the secured VPN tunnel, and route data communication with the VPN through the VPN tunnel.

Some aspects of the subject matter described in this specification can be implemented in methods that include the actions of storing, in a computer-readable medium of a computing device, packages of code and configuration data that associate the packages of code with respective virtual private networks (VPNs), the configuration data associating at least one of the packages of code with at least two of the VPNs; and in response to a request to execute application code included in a first package of code: identifying, based on the configuration data, a first VPN associated with the first package of code, and binding a communication interface of the first package of code to a connection with the first VPN.

Other implementations of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other implementations can each optionally include one or more of the following features, alone or in combination. For example, the computing device can route a communication from the communication interface of the first package of code to the first VPN. In response to a request to execute application code included in a second package of code, the computing device can identify, based on the configuration data, a second VPN associated with the second package of code, establish, at the computing device, a connection with the second VPN, and bind a communication interface of the second package of code to the connection with the second VPN.

In some implementations, the computing device receives a selection through a graphical interface presented on a user interface component of the computing device. In response to the selection, the computing device can generate configuration data that associate a second package of code with a second VPN. The graphical interface can allow a user to indicate a respective selection for each of multiple packages of code, and the packages of code are associated with the respective VPNs based on the selections. In some examples, the graphical interface includes a container associated with a corresponding VPN in the configuration data. Based on one or more selections, the computing device can associate one or more packages of code with the container in the graphic interface and generate configuration data that associate each of the one or more packages of code with the corresponding VPN.

In some examples, the VPNs are each associated with distinct geographic locations. The computing device can determine a current geographic location of the computing device is within a particular geographic location that is associated with a particular VPN of the at least two of the VPNs in the configuration data, establish, at the computing device, a connection with the particular VPN, and bind a communication interface of the at least one package of code to the connection with the particular VPN.

In some examples, the subject matter described in this specification can be implemented so as to realize one or more of the following advantages. An application running on a computing device can be associated with multiple regionally-configured VPNs or multiple VPNs with different purposes, which can enhance user experience. For example, when travelling long distances in a car or an airplane across national borders, e.g., from the United States to Canada, a user can keep watching Netflix content in the computing device without interruption. The computing device can also establish a secure VPN tunnel with the VPN, which can protect privacy and increase security. For example, a business traveler or politician can keep his or her social network usage private and discreet when travelling in a country that uses deep packet inspection on all internet traffic. The computing device enables a user to easily manage VPN connectivity for applications on the computing device through a graphic interface on the computing device, which can also simplify development of applications and reduce development cost. For example, the graphic interface can include one or more containers that each are associated with a distinct VPN, e.g., a regionally-configured VPN, a high-speed VPN, or a high-security VPN. A user can move one or more applications into a container such that each of the applications can be associated with the distinct VPN associated with the container. The container and/or a VPN backend server associated with the distinct VPN can be configured to perform one or more actions for the applications within the container, including employing custom packet filtering or traffic-shaping rules and/or providing an authentication mechanism. The distinct VPN can be connected to a private network in which a control system, e.g., a control system of the user's home(s) or car(s), can be accessed. The user can use the applications in the container to access and/or control the control system. A computing device can include multiple different containers configured for multiple different systems, e.g., a first container for a home control system and a second container for a car control system.

The details of one or more implementations of the subject matter described in this specification are set forth in the accompanying drawings and the description below. Other features, aspects, and advantages of the subject matter will become apparent from the description, the drawings, and the claims.

FIG. 1A is a schematic diagram showing an example data communication system 100. The example data communication system 100 includes a device 102, one or more service computing systems 106, 108, 110, and 112, and a network 104. A data communication system can include additional, different, or fewer features, as appropriate. A user 101 associated with the device 102 can use the device 102 to communicate with the service computing systems 106-112 over the network 104. The device 102 can be configured to manage virtual private network (VPN) connectivity for data communications with one or more service computing systems.

The example network 104 can include a computer network, such as a local area network (LAN), a wide area network (WAN), the Internet, a wireless network, a wired network, a virtual private network, a cellular data network, or a combination of any of the foregoing, connecting any number of mobile computing devices, fixed computing devices and server systems. The network 104 facilitates communication between the device 102 and the service computing systems 106-112. The network 104 can communicate, for example, Internet Protocol (IP) packets, Frame Relay frames, Asynchronous Transfer Mode (ATM) cells, voice, video, data, and other suitable information between network addresses. In addition, while the network 104 is illustrated as a single network, the network can include multiple networks and can provide access to additional networks. The network 104 can include any suitable network configured to communicate with the device 102.

The example device 102 includes a computer-readable medium and data processing apparatus. The computer-readable medium can store instructions that are executable by the data processing apparatus. For example, the device 102 can comprise a smartphone, a tablet computer, a personal computer, a laptop computer, a personal data assistant (PDA), a game console, a network appliance, a device in an automobile, a train, or an airplane, or another type of user device. In the example system 100 of FIG. 1, the device 102 is depicted as a mobile communication device.

The example device 102 is operable to receive requests from the user 101 via a user interface, such as a graphical user interface or any other suitable user interfaces. As shown in FIG. 1, the device 102 is communicably coupled to the service computing systems 106-112. The example device 102 is operable to receive, transmit, process and store any appropriate data. The device 102 can include an input device, such as a keypad, touch screen, mouse, or other device that can accept information, and an output device (e.g., display screen) that conveys information associated with the operation of the resources. Both the input device and output device can include fixed or removable storage media (e.g., memory, etc.) to both receive input from and provide output to users through the display.

Each service computing system 106, 108, 110, or 112 can include one or more computing devices and one or more machine-readable repositories or databases. Each service computing system can provide one or more computing services over a network. For example, the computing services can include a news service provided by a news website such as Yahoo or The New York Times, a social-networking service provided by a social-network website such as Facebook or Twitter, a video service provided by video-service providers such as YouTube or Netflix, a working environment provided by an enterprise computing system, or any appropriate computing service.

In some cases, the computing services are content-controlled, e.g., regionally. In one example, Netflix content changes or is blocked per country based on licensing agreements, which is geographically locked or fenced. In another example, some countries censor what content is allowed or prohibited, and can prohibit access to some news websites or social networking websites when computing devices communicate via networks in the countries. In some cases, the service computing system can restrict content to be accessed. For example, an enterprise system requires authorization for users to access resources within the enterprise system. A video service provider may require authorization for users to watch videos on associated servers.

In some implementations, the device 102 manages VPN connectivity for data communications with one or more service computing systems. A VPN connection can include, for example, a secure data connection based on a security scheme. The VPN security scheme can include Internet Protocol Security (IPsec), Transport Layer Security (TLS) or Secure Socket Layer (SSL), Datagram Transport Layer Security (DTLS), Secure Shell (SSH) VPN, Microsoft Point-to-Point Encryption (MPPE), or Microsoft Secure Socket Tunneling Protocol (SSTP). For example, an SSL VPN can be used to tunnel IP packets on top of a Layer 4 connection oriented protocol, e.g., Transmission Control Protocol (TCP). Alternatively, an IPSec VPN can be established to tunnel encrypted IP packets, e.g., Encapsulation Security Payload (ESP) packets, on top of a connection-less protocol, e.g., IP or User Datagram Protocol (UDP).

The device 102 can include a built-in VPN client configured to authenticate with a VPN server on a service computing system. The VPN server can act as the gateway to a network or computing devices associated with the service computing system. The device 102 can include a built-in VPN client that supports one or more VPN servers on one or more different service computing systems. The VPN client can create an encrypted tunnel between the device 102 and the VPN server such that the device 102 and the service computing system can communicate via the VPN tunnel.

In some implementations, a service computing system such as the service computing system 106 includes a service network 106*a* and one or more computing devices and/or repositories 106*b*. For example, the service computing system 106 can comprise a computing system of an enterprise which provides an enterprise network. The enterprise can comprise a corporate or business entity, a government body, an educational institution, a non-profit institution, or any other organization. The device 102 can use a built-in VPN client to authenticate with a VPN server on the service computing system 106 to access the service network 106*a* and/or further to communicate with the computing devices and/or repositories 106*b* in the service network 106*a*. In some examples, the device 102 establishes a VPN connection through the network 104. In some examples, the service network 106*a* provides Wi-Fi network or other network resources, and the device 102 can establish a VPN connection directly with the service network 106*a*.

In some implementations, a service computing system such as the service computing system 108 includes a VPN server and secured content. The device 102 can authorize with the VPN server via the network 104 and establish a VPN connection with the service computing system 108 to access the secured content. In some implementations, a service computing system such as the service computing system 110 does not include a VPN server. The device 102 can communicate with the service computing system 110 via the network 104 without VPN connection. The communication between the device 102 and the service computing system 100 may be unsecured.

In some implementations, a service computing system such as the service computing system 112 includes a VPN server that can provide VPN services. The example service computing system 112 is connected to another network 114. The service computing system 112 can communicate with another service computing system 116 that is connected to the network 114. The network 114 can be different from the network 104. For example, the network 104 and the network 114 can provide networking services restricted in associated geographic regions. The device 102 is within a geographic region associated with the network 104 and can directly access the network 104 and communicate with other devices connected to the network 104, e.g., the computing systems 106, 108, 110 and 112. However, the device 102 cannot directly access to the service computing system 116, as the service computing system 116 is in a geographic region associated with the network 114 that is different from the geographic region associated with the network 104.

In some examples, the service computing system 112 provides VPN services. As noted above, the device 102 can use a built-in VPN client to authorize with the VPN server on the service computing system 112 to establish a VPN tunnel. The VPN server can direct data traffic from the device 102 via the VPN tunnel to the service computing system 116 through the network 114 or from the service computing system 116 to the device 102 via the VPN channel. In such a way, the device 102 can access one or more computing services provided by the service computing system 116 and/or other service computing systems connected to the network 114. This makes the device 102 access the computing services without regional restrictions.

Figure 1B:
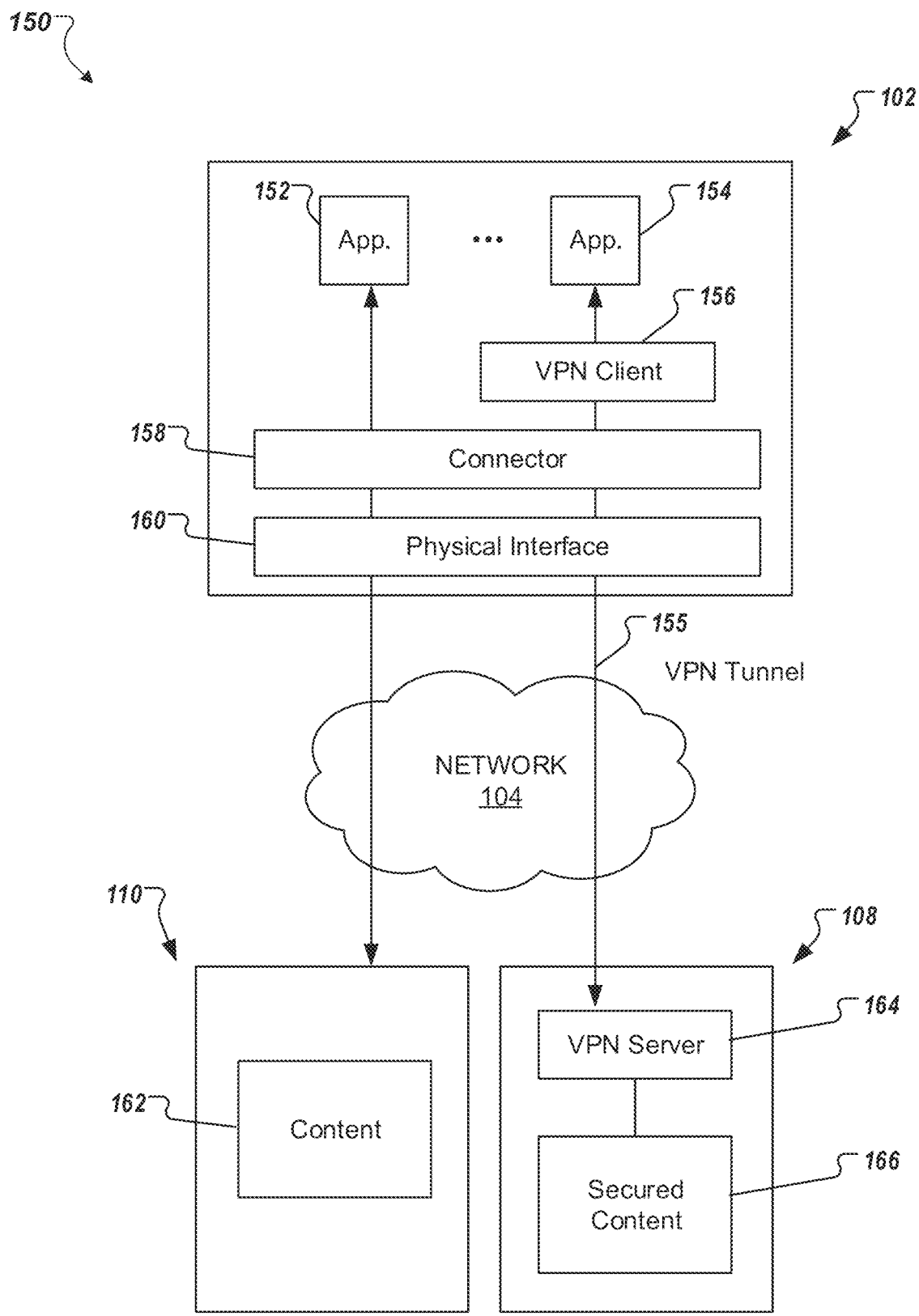
FIG. 1B depicts example data communications between applications in a computing device and service computing systems.

FIG. 1B depicts example data communications between applications in the device 102 and service computing systems such as the service computing system 108 and 110. The device 102 can include packages of code that are executable on the device 102. The packages of code can comprise an application or other executable code on an operating system like Windows, UNIX, or Linux. In the present specification, applications are discussed as example packages of code. Other types of packages of code can be implemented.

Applications can include any suitable program, module, script, process, or other object that can execute, change, delete, generate, or process information. For example, applications can be implemented as Enterprise Java Beans (EJBs). Design-time components can have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the applications can be stored, referenced, or executed remotely. For example, a portion of the applications can comprise an interface to a web service that is remotely executed. Moreover, the applications can comprise a child or sub-module of another software module. Example applications in the device 102 can include without limitation emails, video players, online games, social networking applications, web browsers, or enterprise applications.

The example device 102 includes one or more applications 152 and one or more applications 154. The device 102 can execute an application to access a computing service provided by a computing system in the network 104 through any suitable component or components of a physical interface 160 of the device 102. The connection hardware in the physical interface 160 can include, for example, hardware for a Wi-Fi connection, a cellular connection, Bluetooth, Universal Serial Bus (USB), Radio Frequency Identification (RFID), Near Field Communication (NFC), or other connection technologies. The device 102 can include a connector 158 that provides connectivity to the network 104 and is used to route data traffic for an application to the network 104. The connector 158 may include encryption information, network settings and information, passwords, certificates, and other data. The device 102 can also include one or more policies for applications and network resources within the device 102.

In some examples, the one or more applications 152 are executed to access a computing service provided by the service computing system 110. For example, the one or more applications 152 can comprise a Facebook application. When executed, the Facebook application can be connected to a server associated with Facebook. The connector 158 can route the data traffic from the one or more applications 152 through the physical interface 160 to the network 104, such that the application can access content 162 stored in the service computing system 110 or transmit data with the service computing system 110.

In some implementations, the device 102 includes a VPN client 156. The VPN client 156 can include information about a VPN server, e.g., a VPN server 164 on the service computing system 108. The VPN server 164 can operate as an application-layer proxy to protect secured content 166 from direct exposure to the network 104. As noted above, the VPN client 156 can be used to authorize with the VPN server 164 to establish a secure VPN tunnel for communication.

In some examples, the device 102 associates the one or more applications 154 with a VPN in configuration data that can be stored in a repository associated with the device 102. For example, the device 102 can associate an application identifier (ID) for each application 154 with the VPN in the configuration data. In response to a request to execute the one or more applications 154, the device 102 can identify the associated VPN in the configuration data and establish a VPN connection by the VPN client 156 through the connector 158 and the physical interface 160 to the network 104. The VPN client 156 can be authorized with the VPN server 164 on the service computing system to establish a VPN tunnel 155. The device 102 can bind a communication interface of the one or more applications 154 to the VPN tunnel 155. The VPN server 164 can receive a secure request from the one or more applications 154 via the VPN tunnel 155 and make requests to the secured content 166 to establish data connection between the one or more applications 154 and the requested secured content 166.

The example device 102 can store a number of applications and configuration data that associate the applications with respective VPNs. The applications can be executed based on the associated VPNs. In some examples, an application is associated with one or more VPNs that each are associated with distinct geographic locations, e.g., different countries around the world. If the device 102 determines that the current geographic location is within a geographic location associated with a VPN for the application, the device 102 can establish a connection for the application with the VPN and bind a communication interface of the application with the VPN. In such a way, the device 102 can provide dynamic VPN connectivity for the application. In some examples, an application is associated with one or more VPNs that each are associated with distinct purposes. For example, one of the VPNs can be a high-speed VPN for gaming, and another one of the VPNs can be a high-security VPN for highly sensitive information.

Figure 2:
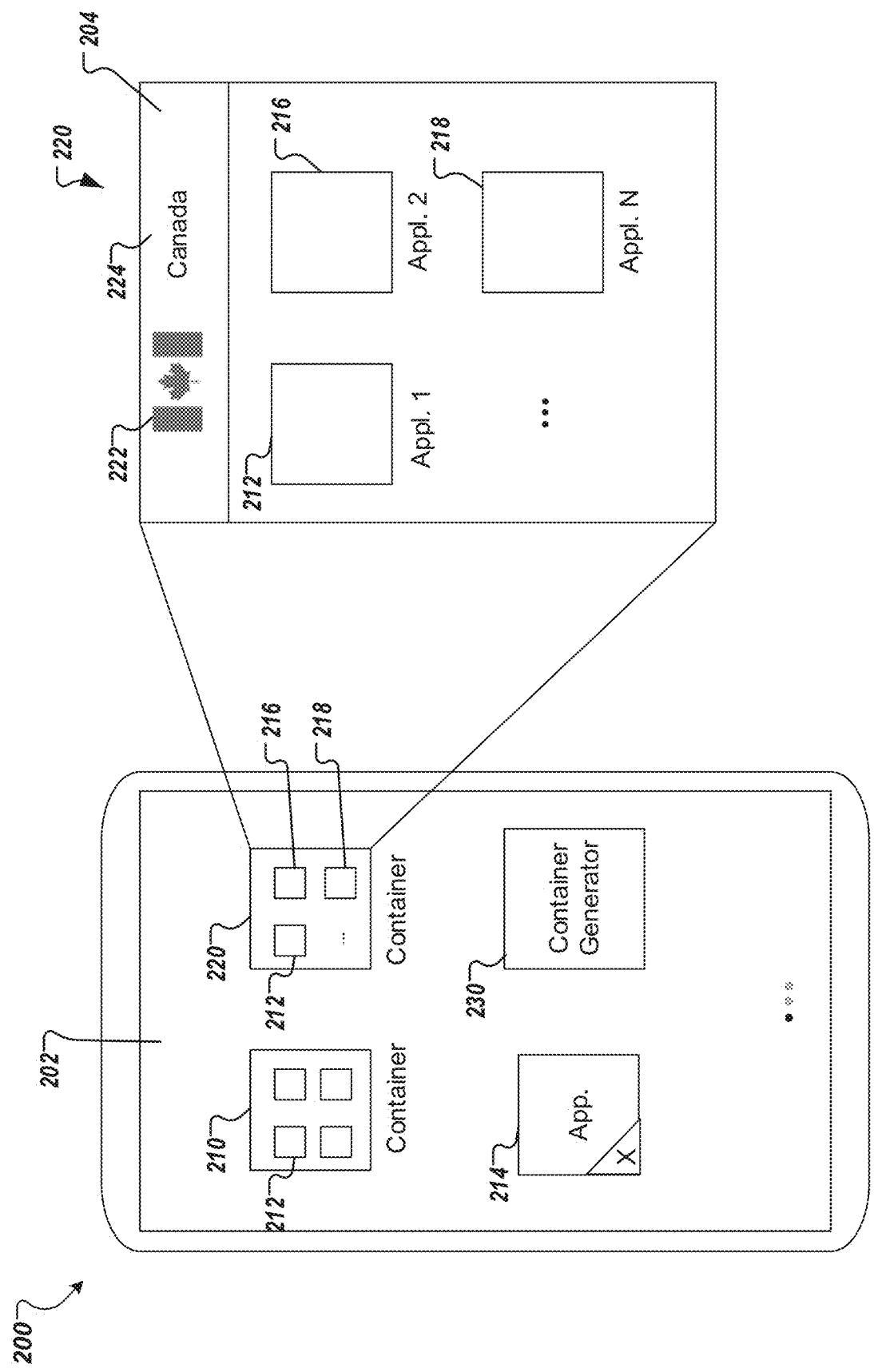
FIG. 2 is a schematic diagram of an example computing device with containers on a graphical interface.

FIG. 2 is a schematic diagram of an example computing device 200 capable of managing VPN connectivity for data communications. The device 200 can be the device 102 of FIGS. 1A and 1B. The device 200 includes a display presenting a graphical interface 202. The device 200 can also include a keyboard or additional features. As illustrated, the device 200 includes a number of applications 212, 214, 216, and 218, and presents application icons for the applications on the graphical interface 202.

The applications can be installed and stored in the device 200 at any suitable stage. In some examples, an application is pre-installed in the device 200 before shipping to a user, e.g., by a manufacturer of the device 200. An entity associated with the application can have an agreement with the manufacturer to pre-install the application in the device 200. The entity can also provide a VPN configuration associated with the application. The device 200 can associate the application with the VPN configuration in configuration data that is stored in a repository in the device 200. The entity can also provide instructions to the manufacturer to not associate the application with any VPN configuration.

In some examples, an application can be installed in the device 200 after the user receives the device 200, e.g., by the user. A user control can be provided to the device 200 so that the device 200 can associate the application with a corresponding VPN when the application is installed or after the application is installed. For example, the user control can be provided through a user's interaction with a touchscreen, a keystroke, a stylus or pointing device, or by another type of user action.

In some implementations, the device 200 includes one or more containers 210 and 220 in the graphical interface 202. In the example shown, each container is associated with a respective VPN configuration in configuration data. The containers can be set up by a manufacturer of the device 200. For example, the device 200 can be pre-installed with one or more enterprise applications associated with an enterprise. The enterprise applications are associated with a VPN configuration provided by the enterprise. The device 200 can set up a container that is associated with the VPN configuration in configuration data. Each enterprise application can be also associated with the container in the configuration data. Application icons for the enterprise applications can be presented within the container on the graphical interface 202.

In some examples, a container is set up by a user control from the user of the device 200. The device 200 can include a list of VPN configurations, e.g., by bootstrapping the device 200 with the list of VPN configurations. Each VPN configuration can be associated with a distinct geographic location, and the list of VPN configurations can be associated with countries around the world. The device 102 can update the list of VPNs through a web service, e.g., from a server providing the VPN web service. In some cases, the device 102 updates a VPN configuration for an application from a server provider associated with the application. For example, the device 102 can receive an updated VPN configuration for an enterprise application from an enterprise.

The device 200 can include a container generator 230 to set up containers based on the list of VPN configurations. For example, the user can launch the container generator 230, e.g., by clicking an icon for the container generator 230 on the graphical interface 202. The container generator 230 can prompt a list of VPN configurations to the user. The user can select a VPN configuration from the list to set up a container. In some examples, the VPN configurations is provided for free. In some other examples, the VPN configuration requires the user to pay for use. The device 200, e.g., the container generator 230, can associate the generated container with the selected VPN configuration in the configuration data. In some cases, the user can also input information of a VPN into the container generator 230 to set up a container. After the container is set up, a container icon for the container can be presented on the graphical interface 202, like the containers 210 and 220.

In some cases, the user can install an application into a container, e.g., by selecting a container from a list of containers presented to the user during installation of the application. In response to selection, the device 200 generates configuration data that associate the application with the container and a corresponding VPN for the container. In some cases, the user can make a selection by moving or dragging an application icon associated with an installed application on the graphical interface 202 into a container. In response to the selection, the device 200 generates configuration data that associate the application with the container and also with a corresponding VPN for the container. In some cases, the user can make a selection by dragging an application between two containers. In response to the selection, the device 200 can generate configuration data that associate the application with each of the VPNs for the two container. The device can also make a prompt to the user, indicating the user to associate the application with one of the containers or both. In some cases, the user makes a selection by removing an application icon out of the container. In response to the selection, the device 200 disassociates the application with the container and the corresponding VPN for the container.

The device 200 can associate an application with one or more VPNs, e.g., by selecting the application into different containers associated with the VPNs. For example, the application 212 is selected into the containers 210 and 220, and the application 212 is associated with a first VPN associated with the container 210 and a second VPN associated with the container 220 in the configuration data. In some implementations, after selecting the application 212 into the containers 210 and 220, the application icon for the application 212 is presented in both of the containers 210 and 220. In some implementations, the application icon for the application 212 can be also presented out of the containers 210 and 220 and on the graphical interface 202. The application icon for the application 212 can be modified to include modifiers that uniquely identify the containers 210 and 220. In some cases, a container, e.g., container X, includes a single application, e.g., application 214. The container X can be collapsed into just a single application icon with an overlaying modifier that uniquely identifies the container X.

The example device 200 can also associate one or more applications with a single VPN, e.g., by selecting the applications into a container on the graphical interface 202. For example, applications 212, 216 and 218 can be selected into the container 220. In some implementations, the containers 210 and 220 are presented on different pages on the graphic interface 202. In some implementations, the containers 210 and 220 are presented like other applications 214 on a same page. When the user clicks the container 220, the container 220 can be presented on a separate page 204 on the graphical interface 202. The separate page 204 can include a container icon 222, a container name 224 and a list of application icons 212, 216 and 218 for the applications 1, 2 . . . , and N.

In some examples, the container 220 is tied to a region, e.g., associated with a VPN that is associated with a geographic location such as Canada. For presentation, the container name 224 can be "Canada," and the container icon 222 can comprise a symbol such as the Canadian flag. In some cases, the container icon 222 can be also set up as a background for the page 204. Each application icon in the container can be a launcher for the application. When the user clicks the application icon, the device 200 launches the application associated with the application icon.

In some examples, a container is tied to a purpose or a property, e.g., associated with a VPN that is associated with a distinct purpose or property. In one example, the VPN associated with the container can be a high-speed VPN that provides high connection speed, which can be used for gaming applications or video networking applications. Each application in the container can be associated with the high-speed VPN for high-speed data communication. In another example, the VPN associated with the container can be a high-security VPN that provides high security for sensitive information such as enterprise data or private data, which can be used for social networking applications or emails or enterprise applications. Each application in the container can be associated with the high-security VPN for high-security data communication.

In some implementations, a container is configured to perform one or more actions for applications within the container (e.g., associated with the container). In some examples, the container employs custom packet filtering or traffic-shaping rules on the applications. The rules can be used to filter out packets belonging to advertising or tracking services. The rules can be also used to recognize and re-prioritize packets belonging to higher-priority activities such as real-time communications, video games, streaming multimedia, or emergency data traffic.

In some examples, the container provides an authentication mechanism for the applications. In one example, the container is associated with an enterprise network, e.g., the applications are enterprise applications that can be used to access enterprise assets or enterprise services. The container can request an NT LAN Manager (NTLM) authentication for the applications or a user before allowing the applications to access the enterprise network. In another example, the container is associated with an account on one or more servers, e.g., a Google account. The account is associated with one or more consumer services on the servers. A use can be authenticated using the account by the container to access the consumer services.

In a particular example, a control system, e.g., a control system of a person's home(s) or car(s), can be accessed from within a private network. A container can be configured to be associated with a VPN connected to the private network. The applications placed within the container can then access the control system or resources associated with the control system. In such a way, a user can use a computing device, e.g., a mobile device, to remotely access and/or control the control system by operating the applications in the container. In some cases, the computing device can include multiple containers for multiple systems, e.g., a first container for a home control system and a second container for a car control system.

In some implementations, a container is linked to a VPN associated with a backend server, e.g., the VPN server 164 of FIG. 1B. The VPN backend server can provide one or more actions for applications placed in the container, including employing custom packet filtering or traffic-shaping rules and/or providing an authentication mechanism to one or more services, as discussed above. In some implementations, authentication configuration and temporary artifacts, e.g., cookies, are stored device-side at a computing device and associated with the container and/or remote-side at the VPN backend server.

In some examples, in response to a request to execute the application, the device 200 can identify, based on configuration data, a VPN associated with the application or the container that includes the application icon. The device 200 can establish a connection with the VPN, e.g., a VPN server on a service computing system, and bind a communication interface of the application to the connection with the VPN. In some examples, before launching the application, a connection with the VPN associated with the container has been established, e.g., for another application in the container. The device 200 can identify the application associated with the VPN and directly bind the communication interface of the application to the connection with the VPN. In some cases, the VPN is associated with a geographic location. The device 200 can determine that the current geographic location, e.g., by a global navigation system (GPS) receiver in the device 200, is within the geographic location associated with the VPN. The device 200 can automatically establish a connection with the VPN. When an application in the container is requested to launch, the device 200 can directly bind a communication interface of the application to the connection with the VPN.

Figure 3A:
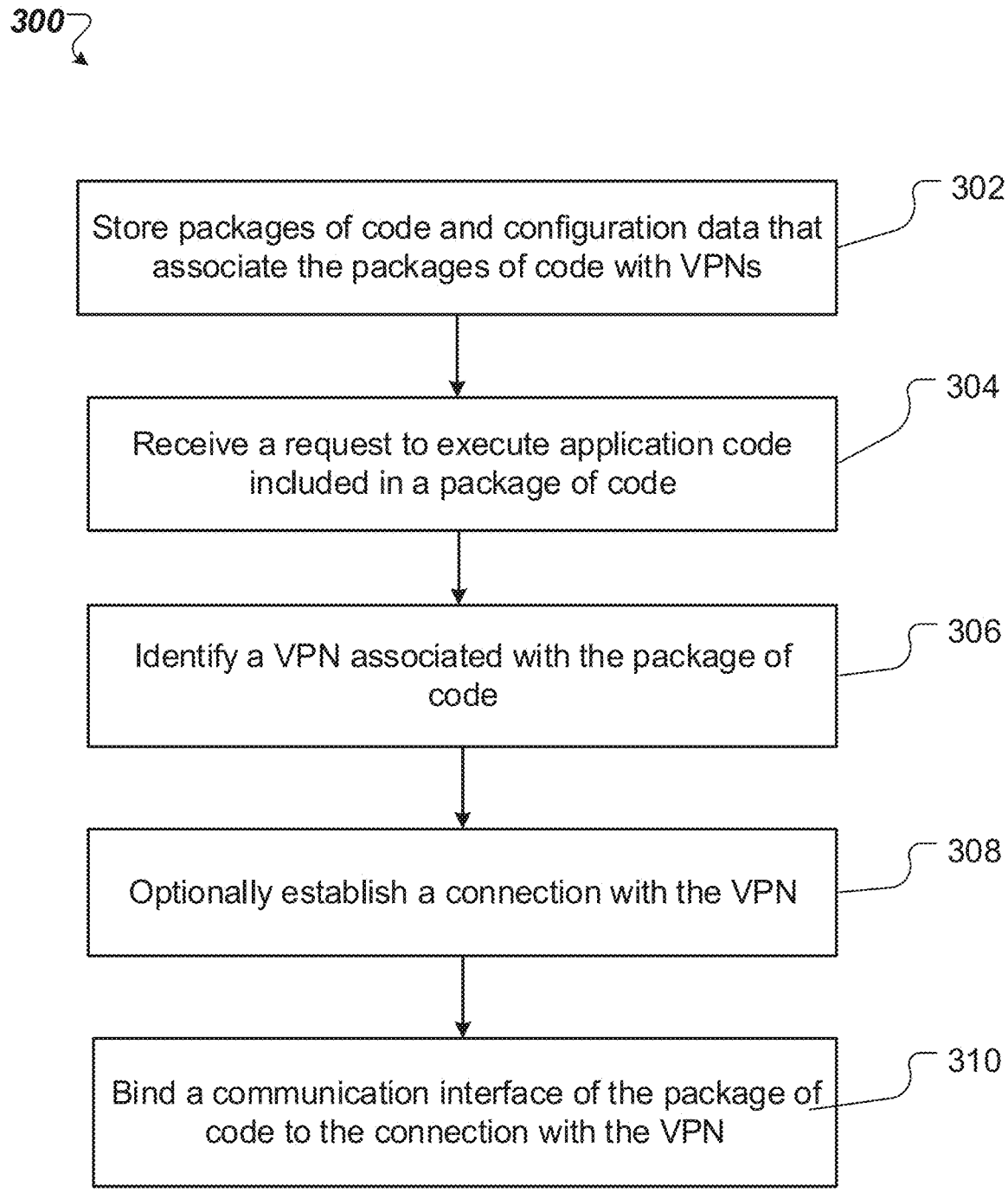
FIG. 3A is a flow diagram of an example process for executing a package of code with VPN connectivity.

FIG. 3A is a flow diagram of an example process 300 for executing a package of code with VPN connectivity. The process 300 can be implemented by a computing device in a communication system. For example, the process 300 can be implemented by the device 102 shown in FIGS. 1A and 1B, the device 200 shown in FIG. 2, or by another type of system or apparatus. The example process 300 shown in FIG. 3A can be implemented using additional, fewer, or different operations, which can be performed in the order shown or in a different order. In some implementations, one or more of the operations can be repeated or iterated, for example, until a terminating condition is reached.

At 302, the device stores packages of code and configuration data that associate the packages of code with respective VPNs. The packages of code can include applications or other executable codes that can be executable on the device. One or more packages of code can be associated with respective VPNs in the configuration data that is stored in a repository associated with the device. A package of code can be associated with a respective VPN during installation. The VPN can be provided by an entity associated with the package of code or selected from a list of VPNs or containers by a user.

In some implementations, the package of code is associated with a respective VPN after installation. The device can receive a selection through a graphical interface, e.g., the graphical interface 202 of FIG. 2, presented on a user interface component of the device, e.g., by moving an icon associated with the package of code into a container or by selecting the respective VPN from a list of VPNs or a list of containers presented to the user. The user selection can be provided through a user's interaction with a touchscreen, a keystroke, a stylus or pointing device, or by another type of user action. In response to the selection, the device can generate configuration data that associate the package of code with the respective VPN. The graphic interface allows the user to indicate a respective selection for each of multiple packages of code, and the packages of code are associated with the respective VPNs based on the selections.

Figure 3B:
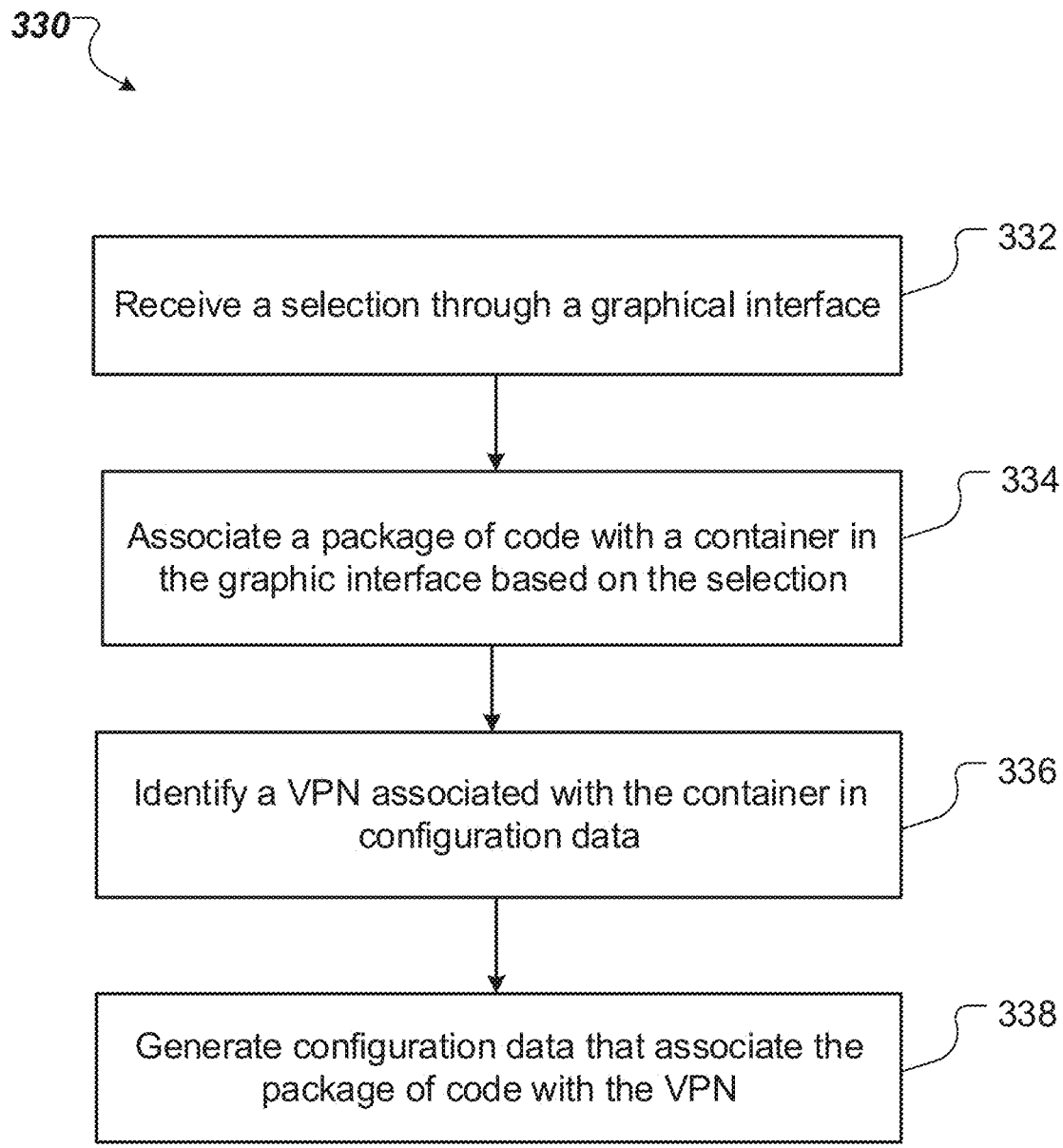
FIG. 3B is a flow diagram of an example process for generating configuration data for a package of code in a container.

In some examples, the graphical interface include a container, e.g., the container 210 or 220 of FIG. 2. The container is associated with a corresponding VPN in the configuration data. FIG. 3B shows an example process 330 for generating configuration data for a package of code in the container. At 332, the device receives a selection through the graphical interface. For example, the selection can be provided by the user moving an icon associated with the package of code into the container on the graphical interface. In response to the selection, at 334, the device associates the package of code with the container, e.g., by including the icons for the packages of code within the container in the graphical interface. At 336, the device identifies a VPN associated with the container in the configuration data, e.g., by searching a container identifier for the container in the configuration data. At 338, the device generates configuration data that associate the package of code with the VPN. In some implementations, based on one or more selections, e.g., by moving the icons for one or more packages of code into the container on the graphical interface, the device can generate configuration data that associate each of the one or more packages of code with the corresponding VPN.

Referring back to FIG. 3A, at 304, the device receives a request to execute application code included in a package of code. The request can be received via user input provided by the user, e.g., by clicking an icon for the package of code on the graphical interface or inputting a command into the device. In response to the request, at 306, the device identifies a VPN associated with the package of code, e.g., by searching an identifier for the package of code in the configuration data.

In some implementations, at 308, the device establishes a connection with the VPN. As noted above, the device can include a built-in VPN client, e.g., the VPN client 156 of FIG. 1B, that can be used to authenticate with a VPN server, e.g., the VPN server 164 of FIG. 1B, on a service computing system or network, e.g., the service computing system 108 of FIGS. 1A and 1B. The VPN client can create an encrypted tunnel between the device and the VPN server such that the device and the service computing system can communicate.

At 310, the device binds a communication interface of the package of code to the connection with the VPN, e.g., to the VPN tunnel. For example, an environment variable can be set to bind sockets in the package of code to the VPN tunnel or a network interface that the VPN is running on. After 310, the package of code is launched, and the device can route a communication from the communication interface of the package of code to the VPN, e.g., communication with a service computing system.

In some implementations, before receiving a request to execute the application code included in a package of code, the connection with the VPN has been established. For example, the package of code can be associated with a container that is associated with the VPN. The connection with the VPN can be established to execute another package of code in the container. In some cases, the connection with the VPN can be established as described in FIG. 3C. In such cases, the process can directly proceed to step 310 without proceeding step 308.

Figure 3C:
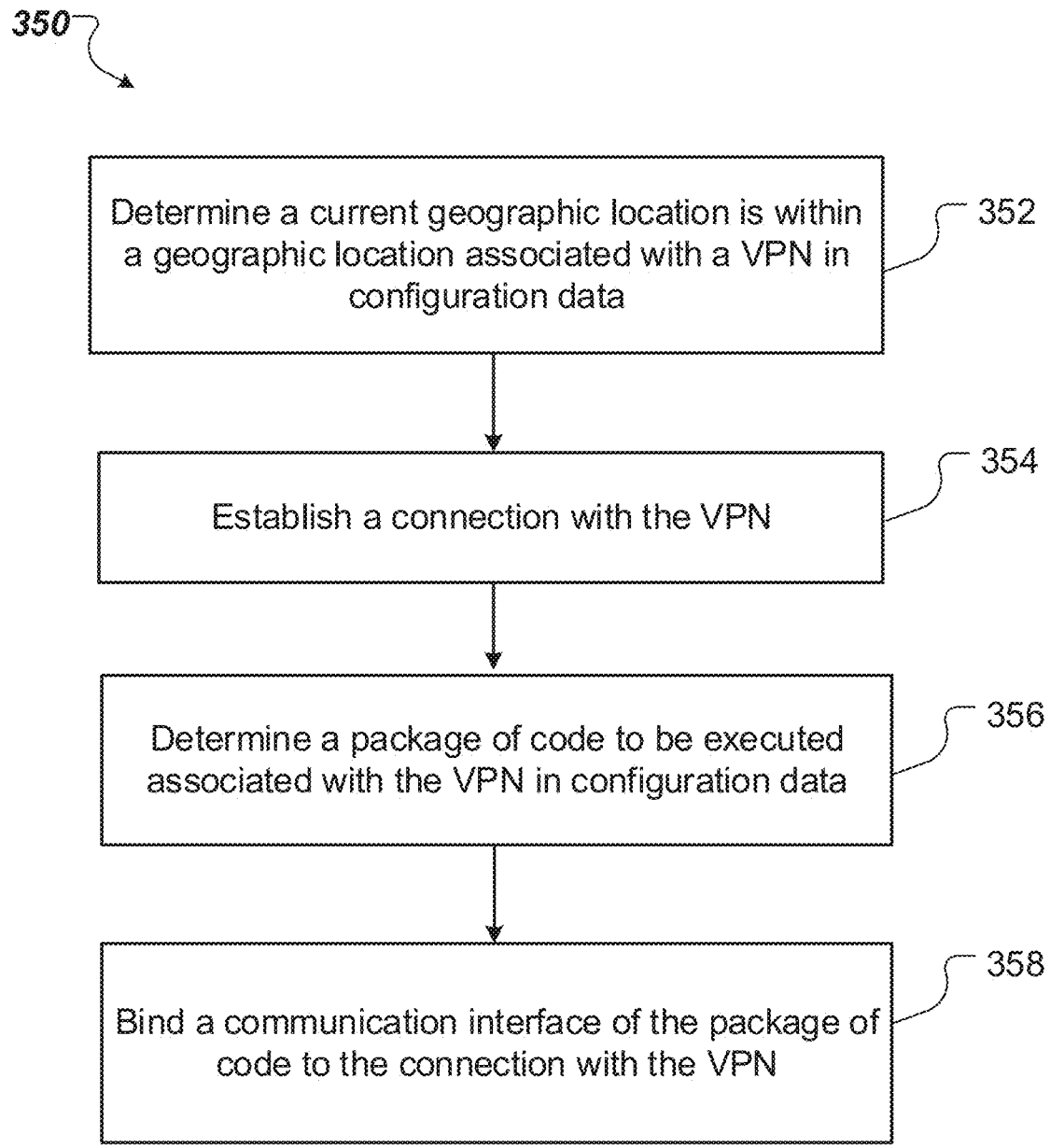
FIG. 3C is a flow diagram of an example process for establishing a VPN connection based on geographic location.

FIG. 3C is a flow diagram of an example process 350 for establishing a VPN connection based on geographic locations. A VPN can be associated with a geographic location, e.g., a country, a state, a province, a metropolitan area, or a city. The VPN can be associated with a container. At 352, the device determines that a current geographic location is within a geographic location associated with the VPN, e.g., by a Global Positioning System (GPS) receiver in the device. At 354, the device automatically establishes a connection with the VPN. The connection with the VPN can be used for all packages of code associated with the container. At 356, the device determines a package of code to be executed associated with the VPN in the configuration data. At 358, the device binds a communication interface of the package of code to the connection with the VPN.

Figure 4:
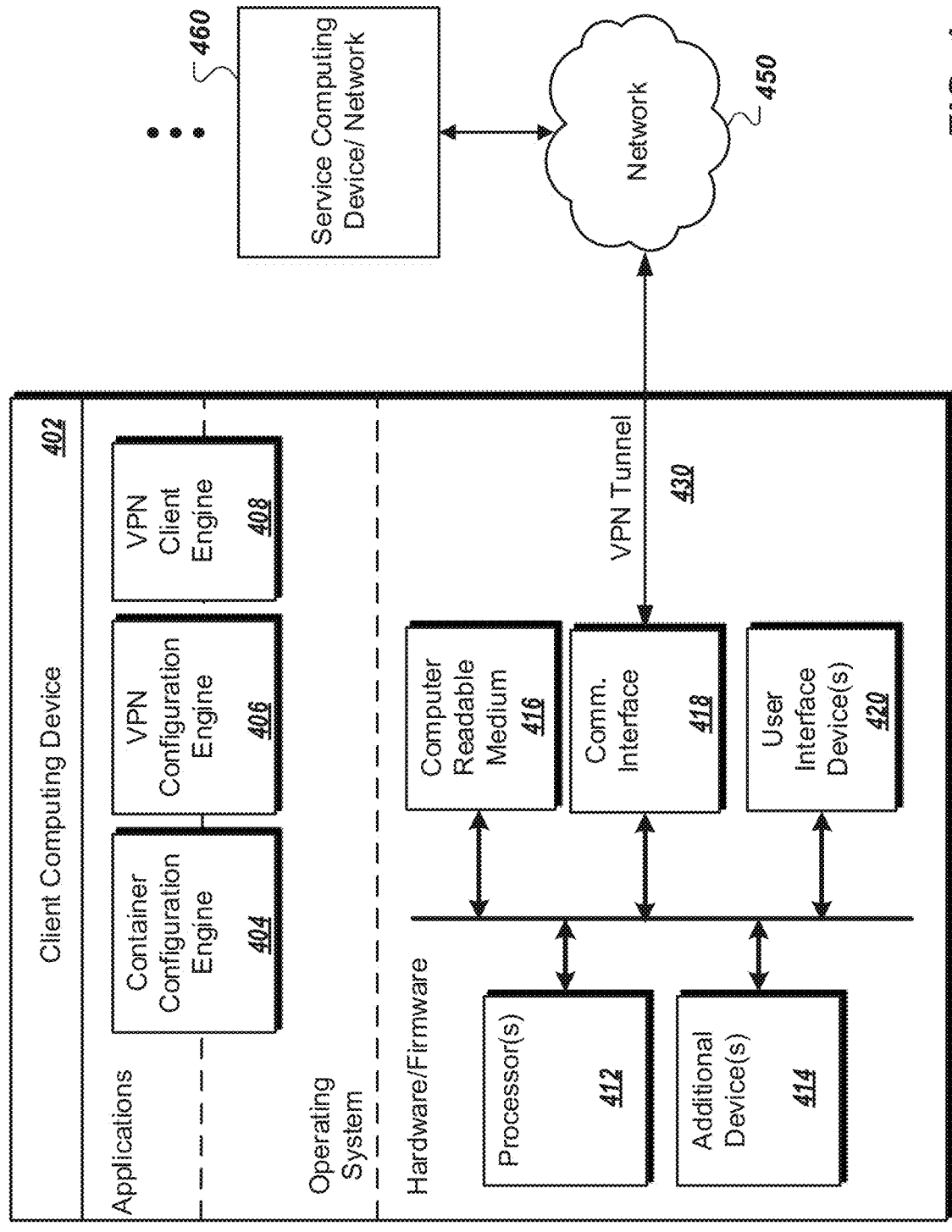
FIG. 4 is a schematic diagram of an example data communication system including an example computing device for managing VPN connectivity for data communications.

FIG. 4 is a schematic diagram of an example data communication system 400 including a computing device 402 configured to manage customized VPN connectivity for data communications. In operation, the device 402 communicates with one or more service computing systems or networks 460 directly or through a network 450. The device 402 includes various components, e.g., components of computer program instructions, including a container configuration engine 404 for setting up containers to be associated with respective VPNs in configuration data, a VPN configuration engine 406 for storing VPNs and associating each VPN with a container identifier and/or one or more application identifiers or associating each container identifier with a respective VPN and/or one or more application identifiers for associating each application identifier with one or more VPNs and/or one or more container identifiers, and a VPN client engine 408 for authenticating with a VPN server on the service computing device or network 460 to establish a secure VPN tunnel.

Each component is configured to run on the device 402. For example, a component can run as part of an operating system on the device 402, as an application on the device 402, or as part of the operating system and part of an application on the device 402. Although several software components are illustrated, the functionality of the mobile device can be implemented in fewer or more software components.

The device 402 also includes hardware or firmware devices including one or more processors 412, one or more additional devices 414, a computer readable medium 416, a communication interface 418, and one or more user interface devices 420. Each processor 412 is capable of executing instructions for execution within the device 402. Each processor 412 is capable of executing instructions stored on the computer readable medium 416 or on a storage device such as one of the additional devices 414. The device 402 uses its communication interface 418 to communicate with one or more service computing systems 460 or networks, for example, over a network 450. The device 402 can establish a secure VPN tunnel 430 with the service computing device/network 460. The device 402 can include one or more of a cellular telephone communication interface, a Bluetooth communication interface, or a WiFi interface. Examples of user interface 420 include a display, a camera, a speaker, a microphone, a tactile feedback device, a keyboard, a click wheel, a mouse, cursor direction keys, and/or a touchscreen for communicating direction information and command selections to processor 412 and for controlling cursor movement on a display.

The example device 402 can comprise the device 102 of FIGS. 1A and 1B or the device 200 of FIG. 2. The example device 402 of FIG. 4 can comprise one computing device to perform steps of the processes illustrated in FIGS. 3A-3C. Other computing devices are possible. For example, the computing device can be a single purpose custom device that is used only for managing VPN connectivity for data communications.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of what can be claimed, but rather as descriptions of features specific to particular implementations. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method comprising:
   receiving, at a computing device, a user input through a graphical interface presented on a user interface component of the computing device, wherein the user input indicates an association between a first software application on the computing device with a first container, and a second software application with a second container, the first container includes a first plurality of software applications, the second container includes a second plurality of software applications, the first container is associated with a first geographic location in a first country, the second container is associated with a second geographic location in a second country that is different from the first country, the first container is associated with a first virtual private network (VPN), and the second container is associated with a second VPN;
   generating, by the computing device and based on the association between the first software application with the first container, VPN configuration data that associates a first application identifier (ID) of the first software application with the first VPN, wherein the VPN configuration data also associates a second application ID of the second software application with the second VPN, the first application ID identifies the first software application, and the second application ID identifies the second software application; and
   prior to receiving a request to execute application code included in the first software application on the computing device:
      identifying, by the computing device and based on the VPN configuration data and a current geographic location of the computing device, the first VPN, wherein the identifying comprises:
         selecting the first VPN among a plurality of VPNs in the VPN configuration data in response to determining that the current geographic location of the computing device is included in the first geographic location associated with the first VPN; and
         determining that the first VPN is associated with the first application ID; and binding, by the computing device, a communication interface of the first software application to a connection with the first VPN.

2. The method of claim 1, further comprising routing a communication from the communication interface of the first software application to the first VPN.

3. A computing device comprising:
one or more data processors; and
a computer-readable medium storing instructions that are operable when executed by the one or more data processors to perform operations comprising:
receiving, at the computing device, a user input through a graphical interface presented on a user interface component of the computing device, wherein the user input indicates an association between a first software application on the computing device with a first container, and a second software application with a second container, the first container includes a first plurality of software applications, the second container includes a second plurality of software applications, the first container is associated with a first geographic location in a first country, the second container is associated with a second geographic location in a second country that is different from the first country, the first container is associated with a first virtual private network (VPN), and the second container is associated with a second VPN;
generating, by the computing device and based on the association between the first software application with the first container, VPN configuration data that associates a first application identifier (ID) of the first software application with the first VPN, wherein the VPN configuration data also associates a second application ID of the second software application with the second VPN, the first application ID identifies the first software application, and the second application ID identifies the second software application; and
prior to receiving a request to execute application code included in the first software application on the computing device:
identifying, by the computing device and based on the VPN configuration data and a current geographic location of the computing device, the first VPN, wherein the identifying comprises:
selecting the first VPN among a plurality of VPNs in the VPN configuration data in response to determining that the current geographic location of the computing device is included in the first geographic location associated with the first VPN; and
determining that the first VPN is associated with the first application ID; and
binding, by the computing device, a communication interface of the first software application to a connection with the first VPN.

4. One or more non-transitory computer-readable media storing instructions that are operable when executed by one or more data processors to perform operations comprising:
receiving, at a computing device, a user input through a graphical interface presented on a user interface component of the computing device, wherein the user input indicates an association between a first software application on the computing device with a first container, and a second software application with a second container, the first container includes a first plurality of software applications, the second container includes a second plurality of software applications, the first container is associated with a first geographic location in a first country, the second container is associated with a second geographic location in a second country that is different from the first country, the first container is associated with a first virtual private network (VPN), and the second container is associated with a second VPN;
generating, by the computing device and based on the association between the first software application with the first container, VPN configuration data that associates a first application identifier (ID) of the first software application with the first VPN, wherein the VPN configuration data also associates a second application ID of the second software application with the second VPN, the first application ID identifies the first software application, and the second application ID identifies the second software application; and
prior to receiving a request to execute application code included in the first software application on the computing device:
identifying, by the computing device and based on the VPN configuration data and a current geographic location of the computing device, the first VPN, wherein the identifying comprises:
selecting the first VPN among a plurality of VPNs in the VPN configuration data in response to determining that the current geographic location of the computing device is included in the first geographic location associated with the first VPN; and
determining that the first VPN is associated with the first application ID; and
binding, by the computing device, a communication interface of the first software application to a connection with the first VPN.

* * * * *